(12) United States Patent
Nakamura et al.

(10) Patent No.: US 12,673,877 B2
(45) Date of Patent: Jul. 7, 2026

(54) METHOD FOR MANUFACTURING SPHERICAL PARTICLE MATERIAL

(71) Applicant: ADMATECHS CO., LTD., Miyoshi (JP)

(72) Inventors: Tempo Nakamura, Miyoshi (JP); Ikuya Matsue, Miyoshi (JP)

(73) Assignee: ADMATECHS CO., LTD., Miyoshi (JP)

(*) Notice: Subject to any disclaimer, the term of this patent is extended or adjusted under 35 U.S.C. 154(b) by 578 days.

(21) Appl. No.: 18/125,179

(22) Filed: Mar. 23, 2023

(65) Prior Publication Data

US 2023/0219823 A1 Jul. 13, 2023

Related U.S. Application Data

(63) Continuation of application No. PCT/JP2021/034871, filed on Sep. 22, 2021.

(30) Foreign Application Priority Data

Sep. 25, 2020 (JP) ................................. 2020-161511

(51) Int. Cl.
| | |
|---|---|
| *C01F 7/422* | (2022.01) |
| *C01F 7/025* | (2022.01) |
| *C01F 7/026* | (2022.01) |

(52) U.S. Cl.
CPC .............. *C01F 7/422* (2013.01); *C01F 7/025* (2013.01); *C01F 7/026* (2013.01);
(Continued)

(58) Field of Classification Search
None
See application file for complete search history.

(56) References Cited

U.S. PATENT DOCUMENTS

2016/0312097 A1* 10/2016 Kitada .................... C08K 3/22

FOREIGN PATENT DOCUMENTS

| | | |
|---|---|---|
| JP | H06-92714 A | 4/1994 |
| JP | H10-137574 A | 5/1998 |
(Continued)

OTHER PUBLICATIONS

Saxena, S. K. Polyvinyl alcohol (PVA)—Chemical and technical assessment (CTA). 61st JECFA, 2004. (Year: 2004).*

(Continued)

*Primary Examiner* — Anthony J Zimmer
*Assistant Examiner* — Zachary John Baum
(74) *Attorney, Agent, or Firm* — Element IP, PLC.

(57) ABSTRACT

Provided is a method for manufacturing a spherical particle material in which the particle size distribution is easily controlled. This method has: a granulation step of granulating a raw particle material formed of an inorganic material having a D50 of not larger than 5 μm to form a granulated body; and a spherizing step of heating and melting the granulated body to form the spherical particle material having a D50 larger than a D50 of the raw particle material. A melting method is used as a basic method for manufacturing the spherical particle material having a necessary particle size distribution. The granulated body is used to manufacture the spherical particle material having the necessary particle size distribution by the melting method.

10 Claims, 5 Drawing Sheets

1-1

1-2

1-3

1-4

1-5

(52) U.S. Cl.
CPC ...... *C01P 2004/32* (2013.01); *C01P 2004/51*
(2013.01); *C01P 2006/80* (2013.01)

(56) References Cited

FOREIGN PATENT DOCUMENTS

| | | |
|---|---|---|
| JP | 2008184485 A | 8/2008 |
| JP | 2012020900 A | 2/2012 |
| JP | 2012193059 A | 10/2012 |
| JP | 2014101239 A | 6/2014 |

OTHER PUBLICATIONS

English translation of JP-H10137574-A. (Year: 1998).*
English translation of JP-H0692714-A. (Year: 1994).*
English translation of JP-2012193059-A (Year: 2012).*
English translation of JP-2014101239-A. (Year: 2014).*
International Search Report issued Nov. 22, 2021 in PCT/JP2021/
034871 (with English translation), 7 pages.
Written Opinion issued Nov. 22, 2021 in PCT/JP2021/034871 (with
English translation), 12 pages.

* cited by examiner 1-1          1-2          1-3

1-4          1-5

1          2          3

2-1          2-2          2-3

2-4          2-5

4                    5

3-1                    3-2                    3-3

6                      7                      8

METHOD FOR MANUFACTURING SPHERICAL PARTICLE MATERIAL

TECHNICAL FIELD

The present invention relates to a method for manufacturing a spherical particle material formed from an inorganic material, and particularly, to a method for manufacturing the spherical particle material in which the particle diameter is easily controlled.

BACKGROUND ART

Examples of the known conventional methods for manufacturing a spherical particle material formed from an inorganic material include: a method (melting method) for manufacturing the spherical particle material by injecting a particle material formed of the inorganic material by a powder supplier or the like into the flame formed by combusting a combustible gas, and heating, melting, and then rapidly cooling the injected particle material so as to continuously have a spherical shape; and a method (VMC method) for continuously manufacturing the spherical particle material, when the inorganic material is a metal oxide, by manufacturing a particle material formed of the metal, and injecting the manufactured particle material into an oxidizing atmosphere to deflagrate the injected particle material.

On the other hand, when the spherical particle material is used as a filler for a semiconductor sealing resin or the like, the spherical particle material of extremely high purity is sometimes required. In that case, the spherical particle material is preferably manufactured by the VMC method using, as a raw material, a metal that is easily refined.

However, since the VMC method does not necessarily allow the spherical particle material having an optional particle diameter to be manufactured, the spherical particle material having a necessary particle diameter is sometimes failed to be obtained.

On the other hand, in the melting method, the particle diameter of the spherical particle material to be manufactured is changed depending on the particle diameter of the particle material before melting. Accordingly, when the spherical particle material having the desired particle diameter needs to be obtained, the particle material as the raw material before melting is adjusted by crushing or the like but a particle size distribution shape thereof becomes broad. Thus, the particle material having a sharp particle size distribution shape and a necessary particle diameter is not necessarily obtained, and the particle size distribution is adjusted by performing sieving or the like, leading to unnecessary work. In addition, the crushed particle material as a raw material has a crushed shape and poor fluidity, thus failing in continuous feeding of powder and stable manufacturing.

Furthermore, crushing media or impurities derived from the crushing environment are sometimes mixed during crushing, and thus improving the purity of the spherical particle material to be manufactured also involves a limit.

CITATION LIST

Patent Literature

Patent Literature 1: JP2012-020900 (A)

SUMMARY OF INVENTION

Technical Problem

The present invention is made in view of the aforementioned circumstances, and an object of the present invention is to provide a method for manufacturing a spherical particle material in which the particle diameter and the particle size distribution are easily controlled, compared to the conventional method.

Solution to Problem

In order to attain the aforementioned object, the inventors of the present invention have made a thorough study. First, a melting method is used as a basic method for manufacturing a spherical particle material having a necessary particle diameter and particle size distribution. To manufacture the spherical particle material having the necessary particle diameter and particle size distribution by the melting method, the particle size distribution of the raw material to be supplied in the melting method was found to need to be accurately controlled. Thus, the use of granulated bodies obtained by granulating the raw particle material having a particle diameter smaller than a particle diameter of a targeted spherical particle material so as to have the necessary particle size distribution was found to be effective.

The present invention has been accomplished by finding out that manufacturing a spherical particle material from the granulated bodies by the melting method leads to manufacturing a spherical particle material having a particle size distribution according to a particle size distribution of the granulated bodies. Specifically, this method does not need performing sieving or the like because the necessary particle size distribution is obtained by granulating the raw particle material having a small particle diameter, and enables manufacturing the spherical particle material from the raw material without waste.

The method for manufacturing the spherical particle material according to the present invention that resolves the above-described problem has: a granulation step of granulating a raw particle material formed of an inorganic material having a D50 of not larger than 5 µm to form a granulated body; and a spherizing step of heating and melting the granulated body to form a spherical particle material having a D50 larger than a D50 of the raw particle material. As used herein, the "D50" represents a particle diameter of a particle at a position of 50% in terms of volume, when the particles are arranged in an order from a particle having the smallest particle diameter. Similarly, a "D10" represents a particle diameter of a particle at a position of 10% and a "D90" represents a particle diameter of a particle at a position of 90%, in terms of volume in the order from the particle having the smallest particle diameter.

Advantageous Effects of Invention

The method for manufacturing the spherical particle material of the present invention has a step of granulating particles each having a particle diameter smaller than a particle diameter of a targeted spherical particle material, and thus enables manufacturing the spherical particle material having a targeted particle size distribution from the raw particle material without waste.

DESCRIPTION OF EMBODIMENT

Figure 1:
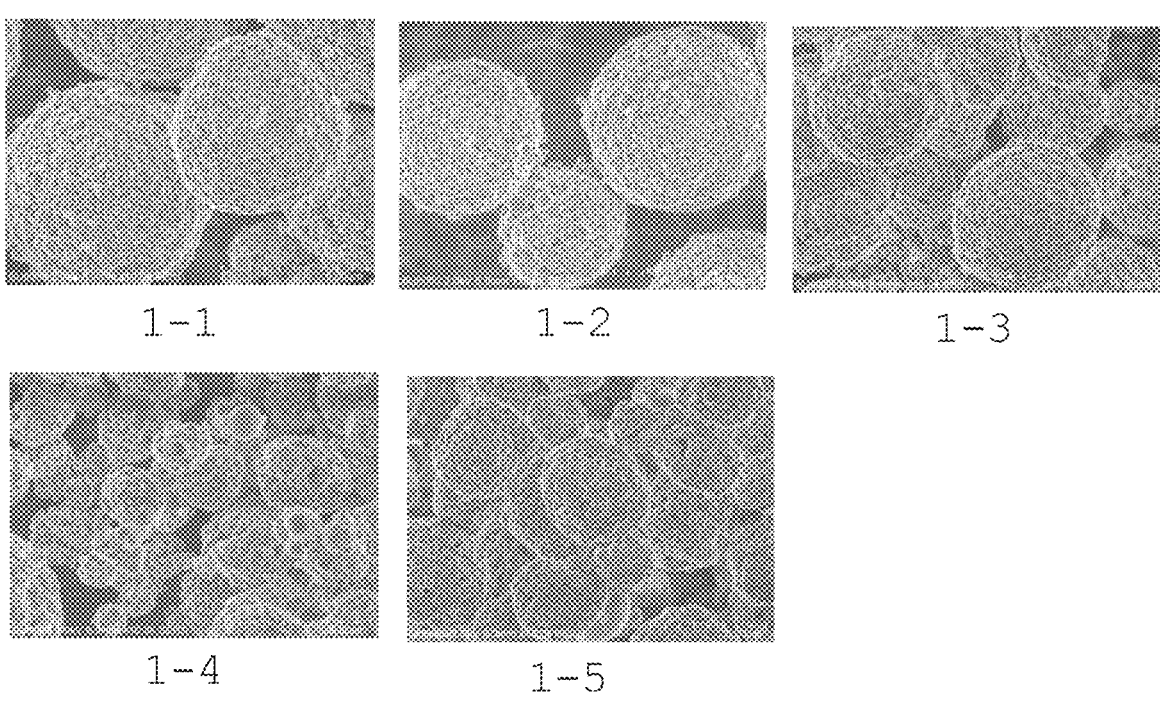
FIG. 1 shows SEM photographs of granulated bodies of Samples 1-1 to 1-5 manufactured in Example.

A method for manufacturing a spherical particle material according to the present invention will be described in detail below based on an embodiment. The method for manufacturing the spherical particle material of the present embodiment is a method for manufacturing a spherical particle material formed of an inorganic material. The inorganic material forming the spherical particle material is not particularly limited, but is composed mainly of a metal oxide, for example, alumina, silica, or the like. Particularly, the inorganic material is preferably formed from alumina or composed mainly of alumina. Being composed mainly of means containing 50% or more by mass of a material as the main component based on the total mass, and preferably containing 60% or more by mass, 70% or more by mass, 80% or more by mass, 90% or more by mass, or 95% or more by mass of the material as the main component based on the total mass. In addition, whether a material is the main component or not is also determined per spherical particle material.

As application of the spherical particle material of the present embodiment, the spherical particle material is particularly used as a filler forming a resin composition by the spherical particle material being dispersed in a resin material, for example. Particularly, an application as a filler for a resin composition for an electronic material is exemplified. When alumina is particularly selected as the inorganic material and the spherical particle material is used as the filler for the resin composition, the spherical particle material is expected to be applied as a thermal interface material (TIM) of extremely high performance, due to the excellent thermal conductivity of alumina.

When the spherical particle material is used as the filler for the electronic material or the like, the spherical particle material preferably has a contained amount of Na of not greater than 5 ppm, from the viewpoint of ensuring insulation reliability or stabilization of reactivity with the resin. Furthermore, when the spherical particle material is particularly used in a part near an IC of a semiconductor memory, a generation amount of α beams is preferably small, in addition to the above. Thus, the spherical particle material preferably has a contained amount of U of not greater than 5 ppb and a contained amount of Th of not greater than 5 ppb, and more preferably the total amount of U and Th is not greater than 5 ppb.

The sphericity of the spherical particle material to be manufactured is not particularly limited, but is not less than 0.8, not less than 0.9, not less than 0.95, not less than 0.99, or the like. The spherical particle material is photographed by an SEM to obtain an area and a perimeter length of the observed particle, and the sphericity is calculated as a value calculated by the formula (sphericity)$=\{4\pi\times(\text{area})\div(\text{perimeter})^2\}$. The closer to 1 the value is, the closer to a true sphere the shape is. Specifically, a mean value of 100 particles measured by image analysis software (Asahi Kasei Engineering Corporation: A-zou kun) is used.

The particle diameter of the spherical particle material to be manufactured by the method for manufacturing the spherical particle material of the present embodiment is not particularly limited, but is preferably set to approximately 1 μm, 2 μm, 3 μm, or 5 μm as a lower limit value and approximately 50 μm, 70 μm, 100 μm, or 150 μm as an upper limit value. The upper limit value and the lower limit value are optionally combined.

The method for manufacturing the spherical particle material of the present embodiment has a granulation step, a spherizing step, and other steps to be used as necessary.

The granulation step is a step of granulating the raw particle material to form a granulated body. Preferably, the granulated body to be manufactured has a high sphericity of, for example, not less than 0.8, not less than 0.9, or not less than 0.95.

The raw particle material also preferably has a high sphericity of, for example, not less than 0.8, not less than 0.9, or not less than 0.95. The particle diameter of the raw particle material is not limited, as long as the particle diameter of the raw particle material is smaller than the particle diameter of the spherical particle material to be finally manufactured and the mean particle diameter (D50) is not larger than 5 μm. However, preferable value examples of the upper limit value of the D50 include 0.1 μm, 0.3 μm, 1 μm, and 3 μm.

As the preferable range of a D50 of the raw particle material in relation to a D50 of the spherical particle material, the D50 of the spherical particle material is preferably 10 times or more as large as the D50 of the raw particle material, more preferably 15 times or more, and further preferably 20 times or more.

The raw particle material is formed of a material forming the spherical particle material. For example, the raw particle material is preferably formed from alumina or silica. In addition, the raw particle material has a single composition or is a mixture of different compositions. As the applicable raw particle material, one having a particle diameter simply controlled by crushing, one manufactured by the melting method, the VMC method, or the like, or further, one obtained by a method combining these methods, or one having a particle diameter further controlled by classification, can be used.

The crushing is not particularly limited, but preferably uses a method such as a jet mill to avoid mixing of impurities. When the crushing is performed on the particle material manufactured by the melting method or the VMC method described below, the particle size distribution is controlled.

The melting method is a method for causing a particle material to have a globular shape, by injecting the particle material into a high-temperature atmosphere to be melted and then rapidly cooling the melted particle material. In a melted state, sphere formation of the particle material is allowed by surface tension, and the particle material is rapidly cooled as it is, thereby obtaining the particle material having a high sphericity.

The VMC method is a method for manufacturing a metal oxide. The metal oxide is produced by combusting (deflagrating) a metal particle material formed from metal contained in the metal oxide under a high-temperature oxidizing atmosphere, and the particle material having a high sphericity is obtained by rapidly cooling the produced metal oxide.

Particularly, when the metal particle material is aluminum, the metal particle material oxidizes, generating an extremely high temperature, and thus the produced metal oxide (alumina) is vaporized once. When the gas is rapidly cooled in a lean state, the gas is turned into spherical fine particles of 5 μm or less. Accordingly, in the VMC method, the fine particles are obtained without need of crushing and also have a low melting point, and the granulated bodies including the fine particles are easily heated and melted afterward. Thus, the particle material having a high sphericity is easily obtained. Therefore, the VMC method is preferable.

Furthermore, the VMC method uses, as the raw material, the metal allowing a high purity material to be easily obtained, and thus the particle material having a controlled contained amount of impurities is easily obtained. Particularly, the metal particle material preferably has a contained amount of Na of not greater than 5 ppm. In addition, contained amounts of U and Th are each preferably not greater than 5 ppb, and the total amount of U and Th is more preferably not greater than 5 ppb.

Examples of the method for performing granulation in the granulation step is not particularly limited, but include: a spray method of spraying and drying a slurry composition in which a raw particle material is dispersed in a dispersion medium; a disk method of supplying a slurry composition to a rotating disk and spraying and drying the slurry in contact with the disk, by centrifugal force; an agitation granulation method; and a fluidized bed granulation method. Particularly, in the spray method and the disk method, surface tension causes droplets of the slurry composition to each have a spherical shape and then dry, and thus the granulated bodies become spherical. Accordingly, excellent fluidity is obtained and the particle size distribution of the granulated bodies is narrowed. Therefore, the spray method and the disk method are preferable.

The granulated bodies to be manufactured preferably have a narrow particle size distribution, and for example, D90/D10 thereof is preferably not larger than 10.0, more preferably not larger than 5.0, and further preferably not larger than 3.0.

The slurry composition preferably contains a binding agent. The binding agent is preferably made from a polymer material, and the binding agent that is oxidized and removed in the spherizing step described below or is decomposed and removed is preferably used. Examples of the binding agent include polyvinyl alcohol (PVA), polyvinylpyrrolidone, polyacrylic acid, carboxymethyl cellulose, and hydroxyethyl cellulose.

The binding agent to be used preferably has a concentration as low as possible. Although the preferable range varies depending on the type of the binding agent, the range is preferably set to approximately 0.1% to 2% based on the slurry composition total mass, for example. When the amount of binding agent that is completely dissolved in a dispersion medium is added, the binding agent is prevented from individually separating from the obtained granulated body. To completely dissolve the binding agent, other than a method of lowering the concentration of the binding agent, a method of sufficiently mixing the dispersion medium and the binding agent is also used. Particularly, when the dispersion medium and the binding agent are mixed before the raw particle material is added, dissolution of the binding agent is promoted. In addition, the dissolubility is preferably improved by appropriately adjusting the pH of the dispersion medium, increasing the temperature during dissolution, or the like.

The binding agent is separated so as to preferably thinly coat each surface of pieces of the raw particle material to form the granulated bodies. In a case in which the binding agent is prevented from individually separating irrespective of the raw particle material, when the spherizing step described below is performed under a condition that the binding agent is oxidized and removed, occurrence of caving in at the part of the binding agent having individually separated is avoided. Therefore, the spherical particle material to be manufactured has a high sphericity.

The spherizing step is a step of integrating the granulated bodies by heating and melting the granulated bodies to be fused among the pieces of the raw particle material forming the granulated bodies. In heating, a condition that the binding agent is decomposed is used. For example, a method of oxidizing and removing the binding agent by heating the binding agent under an oxidizing atmosphere is used. Examples of the atmosphere for oxidizing and removing the binding agent include air, air to which oxygen is added, or oxygen.

As a heating condition, a condition similar to the melting method is used. In other words, the granulated bodies are injected in a high-temperature atmosphere to cause individual particles of the granulated bodies to be suspended, and the particles of the granulated bodies in a state of being separated are heated and melted, and then rapidly cooled, whereby the granulated bodies, as they are, are converted into the spherical particle material.

Regarding the spherical particle material formed from alumina as an example, as the temperature for heating and melting, approximately 1000° C. to 4000° C. is used, and approximately 1500° C. to 3500° C. is preferably used.

To heat and melt the granulated bodies, the flame formed by combusting a combustible gas, plasma, or the like is used. After the granulated bodies are heated, the melted granulated bodies are transferred from a high-temperature atmosphere to a low-temperature atmosphere to be rapidly cooled, whereby the spherical particle material is obtained. The obtained spherical particle material is collected so as to be classified by a filter, a cyclone, or the like.

Other Steps

As another step, a surface treatment may be performed on the raw particle material before granulation, or the surface treatment may be performed on the obtained spherical particle material. As the surface treatment, a silane compound such as a silane coupling agent or silazanes is allowed to react, for example. Various functional groups are introduced on the surface of the spherical particle material by using the silane coupling agent.

Furthermore, classification operation may be performed on the manufactured spherical particle material. The spherical particle material having a necessary particle size distribution is manufactured by the classification operation such as sieving or air classification, for example.

Furthermore, fine inorganic particles (silica or the like) each having a particle diameter of approximately 1 nm to 20 nm may also be added. An addition amount of the fine inorganic particles is approximately 0.1% to 2% based on the total mass.

Purification may be performed on the raw particle material. Since the particle diameter of the raw particle material is small, impurities contained in the raw particle material are easily removed by purification. The purification is performed by a purification using pure water, by an acid purification using an aqueous solution including a highly volatile acid such as hydrochloric acid, or another purification, individually or in combination, for example.

Example

The method for manufacturing the spherical particle material of the present invention will be described in detail based on Example.

(Test 1-1: Investigation of Granulation Condition)

To obtain a granulated body having a D50 of 3 to 10 μm, the following test was performed. In the VMC method, the spherical particle material having such a D50 was difficult to be manufactured directly from alumina. As the raw particle material, alumina particles (D50 of 0.2 μm, super-high purity type AO-902 manufactured by ADMATECHS COMPANY LIMITED, contained amount of Na of less than 1 ppm, contained amount of U of less than 1 ppb, contained amount of Th of less than 1 ppb) were used. The contained amount of Na was analyzed by using ICP-AES manufactured by Agilent Technologies, and the contained amounts of U and Th were analyzed by using ICP-MS manufactured by Agilent Technologies. Such alumina particles ware used to perform granulation and the granulated bodies were manufactured (granulation step). A slurry composition was prepared for the granulation. To 100 parts by mass of the raw particle material, 1.0 parts by mass, in terms of a PVA solid content, of PVA (molecular weight Mw of approximately 100000, PXP-18 manufactured by JAPAN VAM & POVAL CO., LTD., aqueous solution of 8 wt %) was added as a binding agent, and ammonia water (26 mass %) was finally mixed such that the pH of the slurry composition reached 10, whereby the slurry composition was prepared. Pure water was added such that each solid content concentration became concentrations described in Table 1. Here, the solid content concentration is a value to be calculated from the mass of a solid content remaining when dried.

The prepared slurry composition was granulated by using a nozzle type spray drier (nozzle type spray drier NB-12 manufactured by OHKAWARA KAKOHKI CO., LTD., nozzle type RJ-50). As the granulation condition, an air pressure (spray pressure) and a supply amount of the slurry composition were set to values described in Table 1. An inlet temperature of a drying chamber was set to 150° C., and the outlet temperature was 88 to 100° C. Each D50 of the obtained granulated bodies was shown in Table 1.

A collection method is a method of collecting the granulated bodies after the granulation step. A cyclone is classification means capable of catching particles each having a particle diameter of approximately 3 μm or more, and a bag filter is classification means capable of catching an approximately whole amount of the particles when the particles are of submicron order. SEM photographs of the granulated bodies of Samples are shown in FIG. 1.

TABLE 1

| | Raw particle material D50 (μm) | Solid content concentration (mass %) | Air pressure (Mpa) | Supply amount of slurry composition (kg/hr) | Collection method | Collection rate (mass %) | Granulated body D50 (μm) | Granulated body D50/ Raw particle material D50 | Granulated body sphericity |
|---|---|---|---|---|---|---|---|---|---|
| Sample 1-1 | 0.2 | 30 | 0.3 | 24 | cyclone | 99 | 7.0 | 35 | 0.95 |
| Sample 1-2 | | | 0.4 | 27 | | 78 | 7.7 | 39 | 0.95 |
| Sample 1-3 | | 10 | | 22 | | 75 | 5.6 | 28 | 0.94 |
| Sample 1-4 | | | 0.6 | | | 40 | 4.0 | 20 | 0.94 |
| Sample 1-5 | | 15 | | 30 | bag filter | 95 | 4.1 | 21 | 0.96 |

As is apparent from Table 1, a value of each D50 of the granulated bodies was found to be controlled by changing the granulation condition, without changing the D50 of the raw particle material. As is apparent from Table 1, the granulated body that was dense and had a high sphericity was found to be obtained. Particularly, as the D50 of the granulated body to be manufactured became larger relative to the D50 of the raw particle material, the denser granulated body was found to be obtained. In Samples 1-1 to 1-5, the D50 of the granulated body is 20 times or more as large as the D50 of the raw particle material. The preferable granulated body was found to be obtained when the D50 of the granulated body was at least 20 times or more as large as the D50 of the raw particle material.

(Test 1-2)

Regarding the obtained granulated bodies (Sample 1-5), the granulated bodies were suspended in oxygen (feed oxygen) as a feed gas and supplied into the flame formed by supplying and combusting a liquefied petroleum gas (LPG) of 5 $Nm^3/h$ together with oxygen (primary oxygen) of 6 $Nm^3/h$, while supplying oxygen (secondary oxygen) of 14 $Nm^3/h$ into a furnace. By doing so, the supplied granulated bodies melted, then the granulated bodies having melted were rapidly cooled to obtain the spherical particle material, and the obtained spherical particle material was collected by a cyclone and a bag filter (spherizing step). The temperature in the furnace was approximately 2000° C. The supply speed amount of the feed gas was set to 10 $Nm^3/h$ under Condition 1, and 8 $Nm^3/h$ under Condition 2. In Condition 3, ALM-43 (D50 of 3.7 μm) manufactured by SUMITOMO CHEMICAL COMPANY, LIMITED, the ALM-43 being commercially available crushed alumina particles manufactured by the Bayer process being a general method for manufacturing alumina, was used as a test sample in Comparative Example. Except for the above, the test of the spherizing step was performed under the same condition as Condition 1. Melting conditions, samples to be melted, and obtained spherical particle materials are shown in Table 2.

Condition 2. Since the D50 of the granulated body was 4.0 μm, a particle diameter of the spherical particle material and a particle diameter of the granulated body were approximately the same. That is, when the particle diameter and the particle size distribution were adjusted in advance in the granulation step, the melted spherical particle having the particle diameter and the particle size distribution held at the approximately same level was found to be obtained by the spherizing step.

Figure 2:
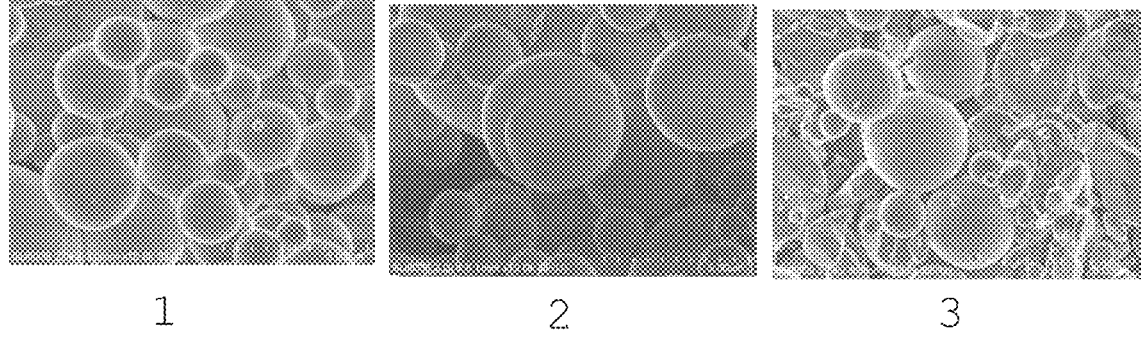
FIG. 2 shows SEM photographs of spherical particle materials manufactured under Conditions 1 to 3 in Example and Comparative Example.

Particularly, the particle diameter and the particle size distribution of the granulated body were easily controlled by this spray method. Screening or the like need not be performed on the granulated body having an extremely sharp particle size distribution, so as to have D90/D10 of less than 3.0, and thus the spherical particle material was found to be manufactured from the raw material without waste. In addition, the sphericity of the obtained spherical particle material was 0.98 under Condition 1 and 0.97 under Condition 2, and the spherical particle material having a high sphericity was obtained as shown in FIG. 2. The reason was considered to be as follows: the raw particle material was fine particles of not larger than 5 μm and had a low melting point, and thus the granulated bodies having a large proportion of such a raw particle material were easily heated and melted afterward, whereby the particle material having a high sphericity was easily obtained.

On the other hand, unlike the above, even when the raw particle material was melted under the same condition as the above, the raw particle material having not completely melted was found to be included in the case of Comparative Example using ALM-43, thereby lowering the sphericity after melting.

The spherical particle material obtained under Condition 1 and Comparative Example obtained under Condition 3 were each dispersed in a liquid epoxy resin ZX-1059 manufactured by TOHTO Chemical Industry Co., Ltd. so as to attain 80% in terms of volume, and the viscosity of the resultant matter was measured by a rheometer, ARES-G2

TABLE 2

| | | | | | | | | | | | Obtained spherical particle material | | | |
| | Melting condition | | | | Sample to be melted | | | | | | | Contained amount of | Contained amount of | Contained amount of | |
| | | Primary | Secondary | Feed | | | | | | | | | | | |
| | LPG ($Nm^3/h$) | oxygen ($Nm^3/h$) | oxygen ($Nm^3/h$) | oxygen ($Nm^3/h$) | Used Sample | D50 (μm) | D50 (μm) | D10 (μm) | D90 (μm) | D90/ D10 | Na (ppm) | U (ppb) | Th (ppb) | Sphericity |
|---|---|---|---|---|---|---|---|---|---|---|---|---|---|---|
| Condition 1 | 5 | 6 | 14 | 10 | Sample 1-5 | 4.0 | 4.4 | 2.7 | 7.0 | 2.6 | <1 | <1 | <1 | 0.98 |
| Condition 2 | 5 | 6 | 14 | 8 | Sample 1-5 | 4.0 | 4.7 | 2.6 | 6.9 | 2.7 | <1 | <1 | <1 | 0.97 |
| Condition 3 | 5 | 6 | 14 | 8 | Commercial product | 3.8 | 4.2 | 1.8 | 6.4 | 3.5 | 75 | 100 | 21 | 0.92 |

As is apparent from Table 2, the obtained spherical particle materials each had a purity similar to a purity of the raw particle material, and the high purity spherical particle material was found to be obtained by using, as a raw particle material, the particles manufactured by the VMC method allowing the purity to be easily improved.

Figure 3:
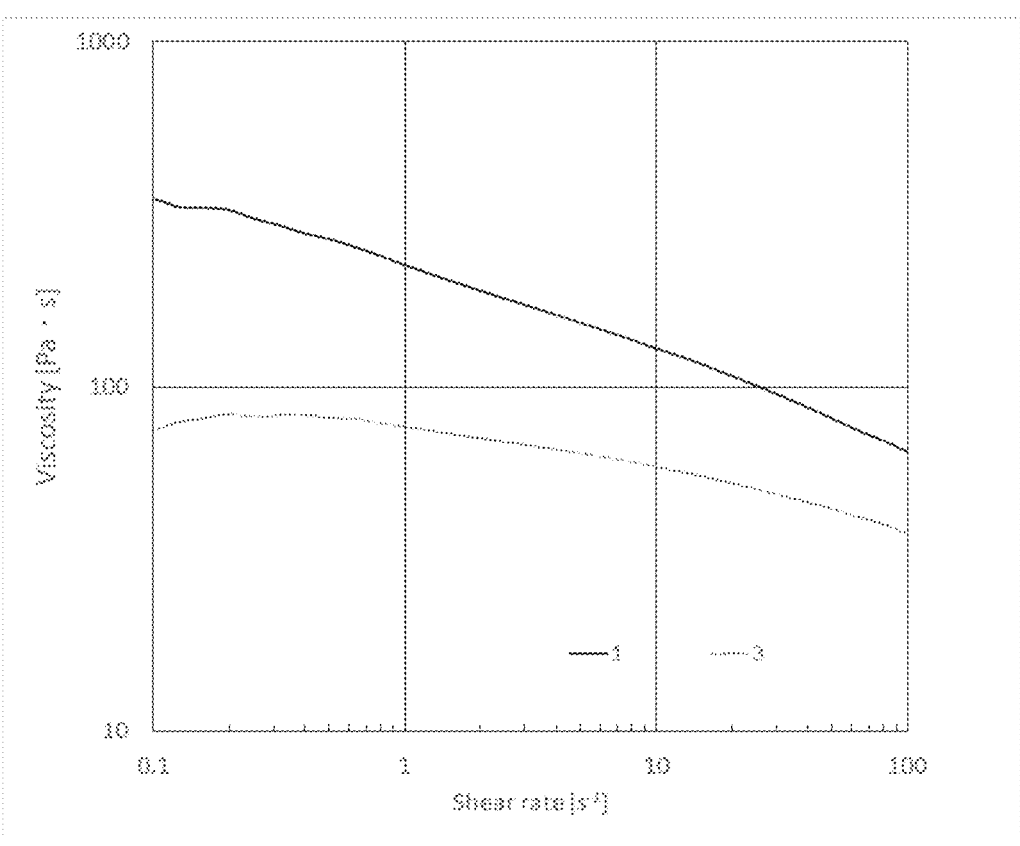
FIG. 3 is a diagram showing the relationship between viscosity and shear rate of each resin composition of a spherical particle material manufactured under Condition 1 in Example and Comparative Example under Condition 3.

Since the particle diameter of the spherical particle material depended on the particle diameter of the granulated body, an optional-dimension spherical particle material was found to be obtained by changing the granulation condition. Specifically, the D50 of the obtained spherical particle material was 4.4 μm under Condition 1, and 4.7 μm under manufactured by TA Instruments Japan Inc. FIG. 3 shows the measurement results. The liquid resin composition obtained under Condition 1 was found to have higher fluidity and lower viscosity. This was considered to be due to the sphericity obtained under Condition 1 being extremely high.

(Test 2-1)

To obtain the granulated body having a D50 of approximately 70 to 80 μm, the following tests were performed. In the VMC method, the spherical particle material having such a D50 was also difficult to be manufactured directly from alumina. As the raw particle material, two kinds of alumina particles having different particle diameters, (raw particle material A: D50 of 9.0 μm; normal purity type AO-509 manufactured by ADMATECHS COMPANY LIMITED, contained amount of Na of less than 1 ppm) and (raw particle material B: D50 of 0.2 μm; normal purity type AO-502 manufactured by ADMATECHS COMPANY LIMITED, contained amount of Na of less than 1 ppm), were used to perform granulation, and the granulated bodies were manufactured (granulation step). The contained amount of Na was measured by ICP-AES manufactured by Agilent Technologies.

Slurry compositions were prepared for the granulation. In each slurry composition, composition ratios (parts by mass) of the raw particle material A and the raw particle material B were set to values shown Table 3. The mean particle diameter of the slurry composition in which the raw particle material A and the raw particle material B were mixed was considered the D50 of the raw particle material. PVA (molecular weight Mw of approximately 100000, PXP-18 manufactured by JAPAN VAM & POVAL CO., LTD., aqueous solution of 8 wt %) of 1.0 parts by mass in terms of a PVA solid content was added as a binding agent, pure water was added such that solid content concentrations became values shown in Table 3, and then ammonia water (26 mass %) was added until the pH reached each value shown in Table 3.

The prepared slurry composition was granulated by using a disk type spray drier (OUDT-25 manufactured by OHKAWARA KAKOHKI CO., LTD., disk type MC-125). As the granulation condition, a disk rotation rate, and an inlet temperature of a drying chamber and an outlet temperature thereof are shown in Table 3. A supply amount of the slurry composition was set to 68 kg/h.

TABLE 3

| | Slurry composition | | | | | Granulation condition | | | | Granulated body | |
| | Raw particle material A (mass ratio) | Raw particle material B (mass ratio) | Mean particle diameter of Composition (Raw particle material D50) (μm) | Solid content concentration (mass %) | pH | Disk rotation rate (rpm) | Inlet temperature (° C.) | Outlet temperature (° C.) | Sphericity | Granulated body D50 (μm) | Granulated body D50/ Raw particle material D50 |
|---|---|---|---|---|---|---|---|---|---|---|---|
| Sample 2-1 | 80 | 20 | 7.2 | 60 | 10 | 13000 | 150 | 100 | 0.88 | 76 | 11 |
| Sample 2-2 | 60 | 40 | 4.6 | 60 | 10 | 13000 | 150 | 100 | 0.94 | 70 | 15 |
| Sample 2-3 | 40 | 60 | 2.3 | 60 | 10 | 13000 | 150 | 100 | 0.97 | 75 | 32 |
| Sample 2-4 | 20 | 80 | 1.5 | 60 | 10 | 13000 | 150 | 100 | 0.98 | 70 | 47 |
| Sample 2-5 | 0 | 100 | 0.2 | 60 | 10 | 13000 | 150 | 100 | 0.98 | 75 | 373 |

Figure 4:
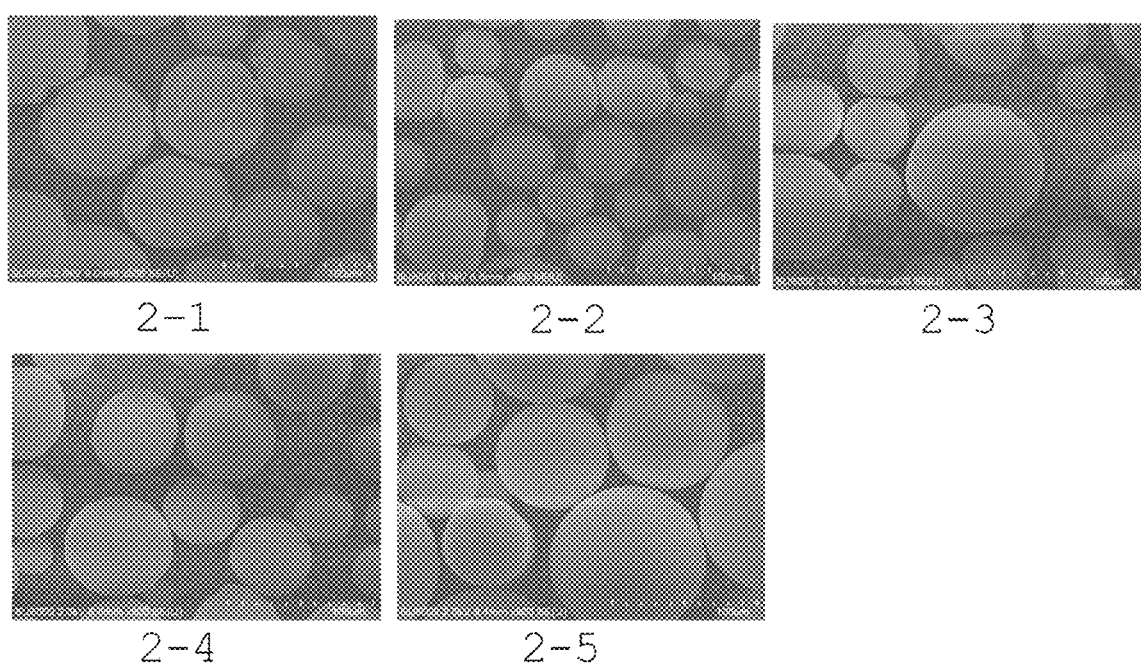
FIG. 4 shows SEM photographs of granulated bodies of Samples 2-1 to 2-5 manufactured in Example.

In Samples 2-1 to 2-5, each D50 was approximately 70 to 80 μm. As is apparent from Table 3 and FIG. 4, the higher a contained amount of the raw particle material B was, the smaller the D50 of the raw particle material (mean particle diameter of composition) was. The sphericity of the granulated body was found to be increased accordingly. Particularly, when the D50 of the granulated body was 15 times or more as large as the D50 of the raw particle material (mean particle diameter of composition), the sphericity of the granulated body exceeded 0.90 and thus excellent fluidity is obtained. Accordingly, feeding of powder is expected to be stabilized in the melting step. Furthermore, the sphericity of the melted spherical particle material is extremely high, as described below.

(Test 2-2)

The granulated body of Sample 2-3 as a test sample in Example, and a commercially available alumina particle (AL-420A manufactured by SUMITOMO CHEMICAL COMPANY, LIMITED, D50 of 95 μm) manufactured by the Bayer process being a general method for manufacturing alumina as a test sample in Comparative Example were used, and tests of the spherizing step were performed (Condition 4, Condition 5). AL-420A was adjusted by performing sieving in advance so as to have a particle diameter and a particle size distribution similar to a particle diameter and a particle size distribution of the granulated body of Sample 2-3.

Figure 5:
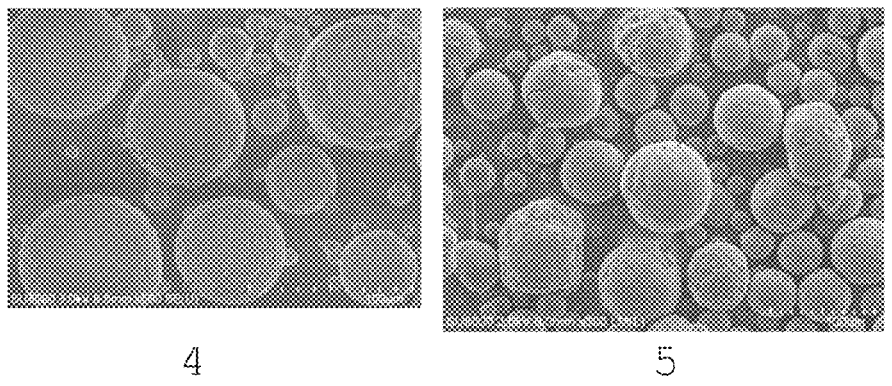
FIG. 5 shows SEM photographs of spherical particle materials manufactured under Condition 4 in Example and Comparative Example under Condition 5.

Regarding the condition of the spherizing step, under both Condition 4 and Condition 5, each test sample was suspended in oxygen (feed oxygen) as a feed gas of 12 Nm³/h and supplied at a speed of 21 to 23 kg/h into the flame formed by supplying and combusting a liquefied petroleum gas (LPG) of 35 Nm³/h together with oxygen (primary oxygen) of 82 Nm³/h, while supplying oxygen (secondary oxygen) of 82 Nm³/h into a furnace. By doing so, the supplied granulated bodies melted, then the granulated bodies having melted were rapidly cooled to obtain the spherical particle material, and the obtained spherical particle material was collected by a cyclone. The temperature in the furnace was approximately 2300° C. Physical properties of each spherical particle material are shown in Table 4. In addition, SEM photographs of the obtained spherical particle materials are shown in FIG. 5.

sphericity of 0.97 as described above, and thus feeding of powder was stabilized by the excellent fluidity in the melting step.

Here, as is apparent from Condition 5 (Comparative Example), the larger the particle diameter is, the more difficult the spherizing generally tends to be. However, since the raw particle material of Condition 4 included fine particles of not larger than 5 μm, the spherical particle material that was easily heated and melted and had a high sphericity was considered to be easily obtained.

Again, sieving or the like need not be performed on the spherical particle material having an extremely sharp particle size distribution so as to have D90/D10 of less than 3.0, and thus the spherical particle material was found to be manufactured from the raw material without waste.

Figure 6:
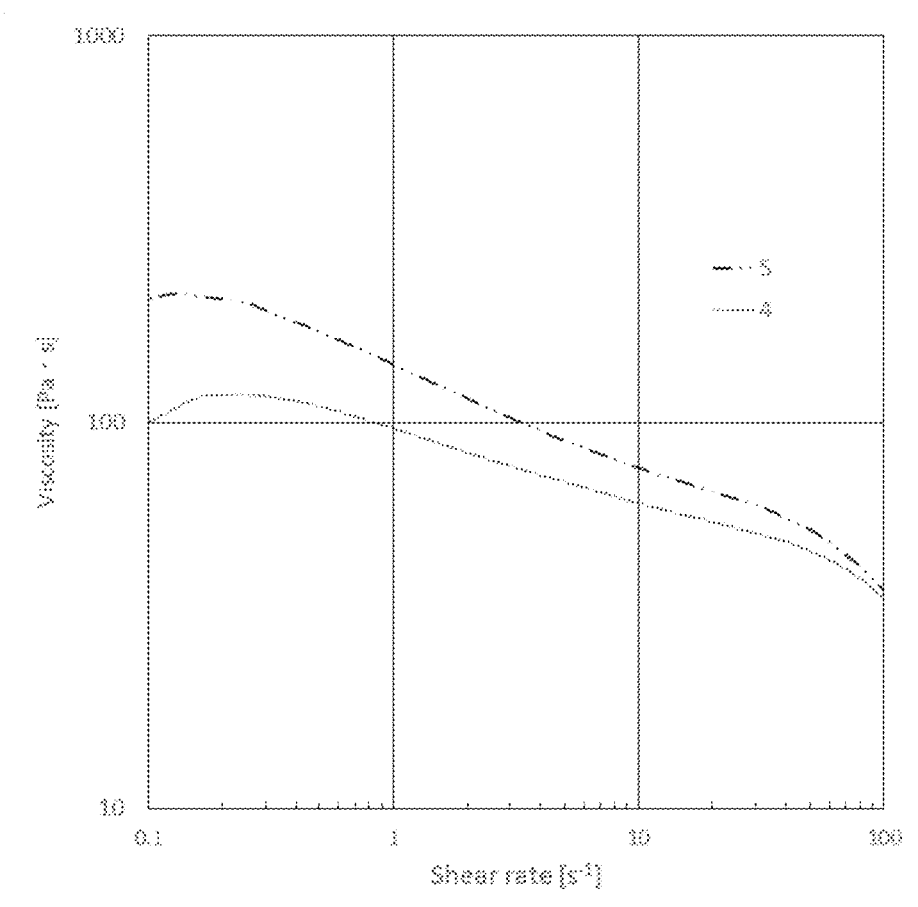
FIG. 6 is a diagram showing the relationship between viscosity and shear rate of each resin composition of a spherical particle material manufactured under Condition 4 in Example and Comparative Example under Condition 5.

The spherical particle material obtained under Condition 4 and Comparative Example obtained under Condition 5 were each dispersed in a liquid epoxy resin ZX-1059 manufactured by TOHTO Chemical Industry Co., Ltd. so as to attain 85% in terms of volume, and the viscosity of the resultant matter was measured by a rheometer. FIG. 6 shows the measurement results. The liquid resin composition obtained under Condition 4 was found to have higher fluidity and lower viscosity. This was considered to be due to the liquid resin composition obtained under Condition 4 having an extremely high sphericity.

Furthermore, a value of Na showed a low value similar to a value of N of the raw particle material in Example. Accordingly, a purity of the spherical particle material to be manufactured was found to be increased by increasing a purity of the raw particle material. For example, the contained amounts of U and Th were also found to be lowered by lowering the contained amounts of U and Th of the raw particle material.

(Test 3-1)

To obtain the granulated body having a D50 of approximately 20 to 30 μm, the following tests were performed. In the VMC method, the spherical particle material having such a D50 was also difficult to be manufactured directly from alumina. As the raw particle material, three kinds of alumina particles having different particle diameters, (raw particle material A: D50 of 9.0 μm; normal purity type AO-509 manufactured by ADMATECHS COMPANY LIMITED, contained amount of Na of less than 1 ppm), (raw particle

TABLE 4

| | Melting condition | | | | Granulated body | | Obtained spherical particle material | | | | | |
| | | | | | | | | | | | Contained | |
| | LPG (Nm³/h) | Primary oxygen (Nm³/h) | Secondary oxygen (Nm³/h) | Feed oxygen (Nm³/h) | Used sample | Granulated body D50 (μm) | D50 (μm) | D10 (μm) | D90 (μm) | D90/ D10 | amount of Na (ppm) | Sphericity |
|---|---|---|---|---|---|---|---|---|---|---|---|---|
| Condition 4 | 35 | 82 | 82 | 12 | Sample 2-3 | 75 | 70 | 38 | 110 | 2.9 | <1 | 0.98 |
| Condition 5 | 35 | 82 | 82 | 12 | Commercial product (Classification) | 72 | 69 | 30 | 101 | 3.4 | 70 | 0.94 |

Figure 7:
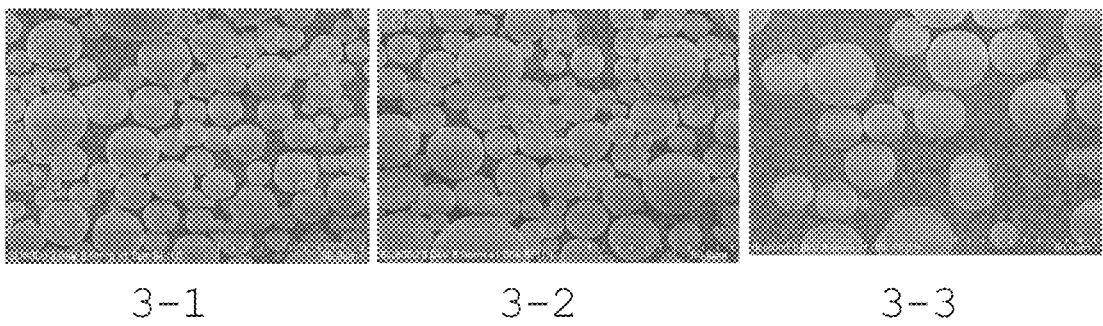
FIG. 7 shows SEM photographs of granulated bodies of Samples 3-1 to 3-3 manufactured in Example.

As is apparent from Table 4 and FIG. 5, although the melting conditions were the same, the sphericity was 0.98 under Condition 4 and was 0.94 under Condition 5 (Comparative Example), that is, each sphericity was different, and the spherical particle material having an extremely high sphericity was found to be obtained. This was considered to be due to the granulated body (Sample 2-3) having a material B: D50 of 0.2 μm; normal purity type AO-502 manufactured by ADMATECHS COMPANY LIMITED, contained amount of Na of less than 1 ppm), and (raw particle material C: D50 of 0.2 μm; super-high purity type AO-902 manufactured by ADMATECHS COMPANY LIMITED, contained amount of Na of less than 1 ppm, contained amount of U of less than 1 ppb, contained amount of Th of less than 1 ppb), were used to perform granulation, and the granulated bodies were manufactured (granulation step). SEM photographs of the obtained granulated bodies are shown in FIG. 7.

Slurry compositions were prepared for the granulation. The slurry compositions are of three kinds in which the raw particle material A and the raw particle material B mixed at composition ratios (parts by mass) of values shown in Table 5 were used, the raw particle material B was used individually, and the raw particle material C was used individually. Here, a mean particle diameter of the slurry composition in which the raw particle material A and the raw particle material B were mixed was considered a D50 of the raw particle material.

In addition, PVA (molecular weight Mw of approximately 100000, PXP-18 manufactured by JAPAN VAM & POVAL CO., LTD., aqueous solution of 8 wt %) of 1.0 parts by mass in terms of a PVA solid content was mixed, as a single binding agent. Pure water was added so that solid content concentrations were the values shown in Table 5, and then ammonia water (26 mass %) was added until the pH reached each value in Table 5.

The prepared slurry composition was granulated by using a disk type spray drier (OUDT-25 manufactured by OHKAWARA KAKOHKI CO., LTD., disk type MC-125). As the granulation condition, a disk rotation rate, and an inlet temperature of a drying chamber and an outlet temperature thereof are shown in Table 5. A supply amount of the slurry composition was set to 35 kg/h.

TABLE 5

| | Slurry composition | | | | | | Granulation condition | | | | Granulated body | |
| | Raw particle material A (mass ratio) | Raw particle material B (mass ratio) | Raw particle material C (mass ratio) | Mean particle diameter of Composition (Raw particle material D50) (μm) | Solid content concentration (%) | pH | Disk rotation rate (rpm) | Inlet temperature (° C.) | Outlet temperature (° C.) | Sphericity | Granulated body D50 (μm) | Granulated body D50/ Raw particle material D50 |
|---|---|---|---|---|---|---|---|---|---|---|---|---|
| Sample 3-1 | 10 | 90 | 0 | 1.2 | 50 | 10 | 25000 | 150 | 100 | 0.95 | 24 | 20 |
| Sample 3-2 | 0 | 100 | 0 | 0.2 | 50 | 10 | 25000 | 150 | 100 | 0.98 | 26 | 130 |
| Sample 3-3 | 0 | 0 | 100 | 0.2 | 50 | 10 | 25000 | 150 | 100 | 0.98 | 26 | 130 |

In Samples 3-1 to 3-3, each D50 was approximately 20 to 30 μm. As is apparent from Table 5 and FIG. 7, the higher a contained amount of the raw particle material B was, the smaller the D50 of the raw particle material (mean particle diameter of composition) was. The sphericity of the granulated body was found to be increased accordingly. Particularly, when the D50 of the granulated body was 20 times or more as large as the D50 of the raw particle material (mean particle diameter of composition), the sphericity of the granulated body was found to be not less than 0.95.
(Test 3-2)

The granulated bodies of Samples 3-1 to 3-3 were used as the test samples in Example, and the tests of the spherizing step were performed (Condition 6 to Condition 8).

Regarding the condition of the spherizing step, under Conditions 6 to 8, each test sample was suspended in oxygen (feed oxygen) of 12 Nm³/h as a feed gas and supplied at a speed of 40 to 80 kg/h into the flame formed by supplying and combusting a liquefied petroleum gas (LPG) of 35 Nm³/h together with oxygen (primary oxygen) of 82 Nm³/h, while supplying oxygen (secondary oxygen) of 82 Nm³/h into a furnace. By doing so, the supplied granulated bodies melted, then the granulated bodies having melted were rapidly cooled, and the obtained spherical particle material was collected by a cyclone. The temperature in the furnace was approximately 2300° C.

Figure 8:
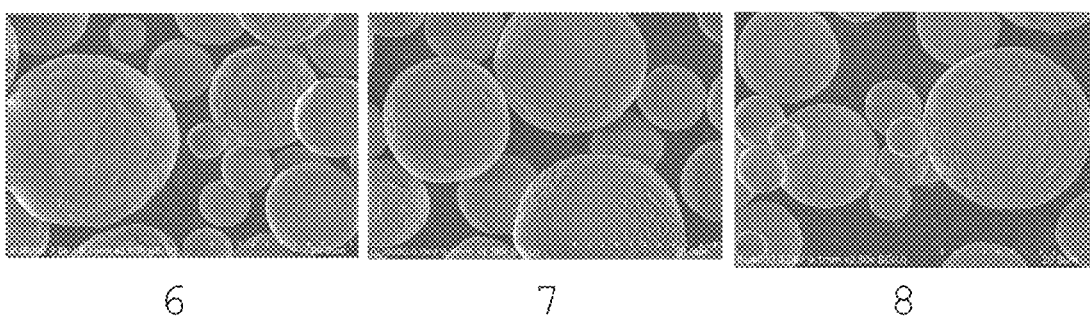
FIG. 8 shows SEM photographs of spherical particle materials manufactured under Conditions 6 to 8 in Example.

Physical properties of each spherical particle material are shown in Table 6, and SEM photographs thereof are shown in FIG. 8.

TABLE 6

| | Melting condition | | | | Granulated body sample | | Obtained spherical particle material | | | | | | | | |
| | LPG (Nm³/h) | Primary oxygen (Nm³/h) | Secondary oxygen (Nm³/h) | Feed oxygen (Nm³/h) | Used sample | Granulated body D50 (μm) | D50 (μm) | D10 (μm) | D90 (μm) | D90/ D10 | Contained amount of Na (ppm) | Contained amount of U (ppb) | Contained amount of Th (ppb) | Sphericity |
|---|---|---|---|---|---|---|---|---|---|---|---|---|---|---|
| Condition 6 | 35 | 82 | 82 | 12 | Sample 3-1 | 24 | 21 | 14 | 35 | 2.5 | <1 | — | — | 0.98 |
| Condition 7 | 35 | 82 | 82 | 12 | Sample 3-2 | 26 | 23 | 14 | 40 | 2.9 | <1 | — | — | 0.98 |
| Condition 8 | 35 | 82 | 82 | 12 | Sample 3-3 | 26 | 24 | 16 | 43 | 2.7 | <1 | <1 | <1 | 0.98 |

Similarly to the spherical particle material having a different particle diameter as described above, since the obtained spherical particle materials each have a purity similar to a purity of the raw particle material, the high purity spherical particle material is considered to be easily obtained by using, as a raw particle material, the particles manufactured by the VMC method allowing the purity to be easily improved.

Since the particle diameter of the spherical particle material depended on the particle diameter of the granulated body, an optional-dimension spherical particle material was confirmed to be manufactured by changing the granulation condition. That is, when the particle diameter and the particle size distribution are adjusted in advance in the granulation step, the melted spherical particle having the particle diameter and the particle size distribution held at approximately the same level is obtained.

In addition, the spherical particle materials obtained under the conditions as shown in Table 6 and FIG. 8 were confirmed to have an extremely high sphericity.

As described above, according to the present invention, the spherical particle material having not only an extremely small contained amount of Na but also an extremely small contained amount of U and an extremely small contained amount of Th and having an extremely high sphericity, an optional particle diameter, and a sharp particle size distribution is obtained without waste.

The invention claimed is:

1. A method for manufacturing a spherical particle material, the method comprising:
a granulation step of granulating a raw particle material formed of an inorganic material having a D50 of not larger than 5 μm to form a granulated body, the granulated body having a D50 which is 15 times or more as large as the D50 of the raw particle material; and
a spherizing step of heating and melting the granulated body to form a spherical particle material having a D50 which is 10 times or more as large as the D50 of the raw particle material,
wherein the raw particle material has a sphericity of not less than 0.95.

2. The method for manufacturing the spherical particle material according to claim 1, wherein
the granulation step is a step of granulating a slurry composition that is a mixture of the raw particle material, a binding agent, and a dispersion medium by spray drying, and the spherizing step is a step to be performed under a condition that the binding agent is oxidized and removed under an oxidizing atmosphere.

3. The method for manufacturing the spherical particle material according to claim 2, wherein the binding agent in the slurry composition is completely dissolved in the dispersion medium.

4. The method for manufacturing the spherical particle material according to claim 2, wherein a pH of the slurry composition is not less than 9.

5. The method for manufacturing the spherical particle material according to claim 1, wherein
the inorganic material contains 50% or more by mass of alumina based on a total mass, and
the raw particle material is manufactured in a deflagration step of deflagrating a metal particle material formed of metal aluminum under an oxidizing atmosphere to form alumina.

6. The method for manufacturing the spherical particle material according to claim 5, wherein
the metal particle material has a contained amount of Na of not greater than 5 ppm, and
the spherical particle material has a contained amount of Na of not greater than 5 ppm.

7. The method for manufacturing the spherical particle material according to claim 5, wherein
the metal particle material has a contained amount of U of not greater than 5 ppb and a contained amount of Th of not greater than 5 ppb, and
the spherical particle material has a contained amount of U of not greater than 5 ppb and a contained amount of Th of not greater than 5 ppb.

8. The method for manufacturing the spherical particle material according to claim 1, wherein D90/D10 of the spherical particle material is not larger than 3.0.

9. The method for manufacturing the spherical particle material according to claim 5, further comprising a diameter controlling step of controlling a diameter of the raw material particles by classification, after the deflagration step.

10. The method for manufacturing the spherical particle material according to claim 1, wherein the spherical particle material has a sphericity of 0.97 or more.

* * * * *